United States Patent
Nishimura et al.

(10) Patent No.: US 10,829,593 B2
(45) Date of Patent: Nov. 10, 2020

(54) TRIAZINE RING-CONTAINING POLYMER, AND COMPOSITION FOR FILM FORMATION USE CONTAINING SAME

(71) Applicant: NISSAN CHEMICAL INDUSTRIES, LTD., Tokyo (JP)

(72) Inventors: Naoya Nishimura, Funabashi (JP); Takahiro Kaseyama, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 272 days.

(21) Appl. No.: 15/578,993

(22) PCT Filed: Jun. 1, 2016

(86) PCT No.: PCT/JP2016/066113
§ 371 (c)(1),
(2) Date: Dec. 1, 2017

(87) PCT Pub. No.: WO2016/194926
PCT Pub. Date: Dec. 8, 2016

(65) Prior Publication Data
US 2018/0142064 A1    May 24, 2018

(30) Foreign Application Priority Data

Jun. 3, 2015 (JP) .................. 2015-113073
Oct. 14, 2015 (JP) .................. 2015-202798

(51) Int. Cl.
C08G 73/06 (2006.01)
C09D 179/04 (2006.01)
C08G 73/02 (2006.01)

(52) U.S. Cl.
CPC ..... *C08G 73/0644* (2013.01); *C08G 73/0273* (2013.01); *C08G 73/065* (2013.01); *C09D 179/04* (2013.01); *C08G 73/026* (2013.01)

(58) Field of Classification Search
CPC .............................................. C08G 73/0644
See application file for complete search history.

(56) References Cited

U.S. PATENT DOCUMENTS

2012/0049308 A1  3/2012  Nishimura et al.
2015/0094420 A1  4/2015  Nishimura et al.

FOREIGN PATENT DOCUMENTS

| JP | 07118382 A | * | 5/1995 | |
| JP | 9-87385 A | | 3/1997 | |
| JP | 10287745 A | * | 10/1998 | |
| JP | 2004-156001 A | | 6/2004 | |
| WO | WO 2010/128661 A1 | | 11/2010 | |
| WO | WO-2012057104 A1 | * | 5/2012 | ......... C08G 73/0273 |
| WO | WO 2013/168787 A1 | | 11/2013 | |

OTHER PUBLICATIONS

Machine Translation of WO2012/057104 A1. May 3, 2012. (Year: 2012).*
Machine Translation of JPH10-287745A. Oct. 27, 1998. (Year: 1998).*
Machine Translation of JPH07-118382A. May 9, 1995. (Year: 1995).*
Kim, J. J. et al. Preparation and properties of poly(2,4-bisthio substituted 6-fluorine-containing group substituted 1,3,5-triazine)s. Kobunshi Ronbunshu, 1999, 56, 314-322. (Year: 1999).*
International Search Report issued in PCT/JP2016/066113 (PCT/ISA/210), dated Aug. 9, 2016.
Written Opinion of the International Searching Authority issued in PCT/JP2016/066113 (PCT/ISA/237), dated Aug. 9, 2016.

* cited by examiner

*Primary Examiner* — Stephen E Rieth
(74) *Attorney, Agent, or Firm* — Birch, Stewart, Kolasch & Birch, LLP

(57) ABSTRACT

A triazine ring-containing polymer which contains a repeating unit structure represented by, for example, formula [4] has a high refractive index and also has excellent solubility in various organic solvents including low-polarity solvents, hydrophobic solvents and low-boiling point solvents. A thin film having a high refractive index and excellent transparency can be formed using a composition for film formation use which contains the polymer.

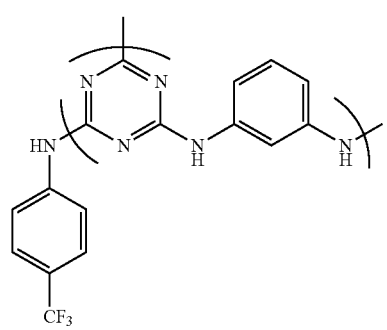

[4]

12 Claims, 1 Drawing Sheet

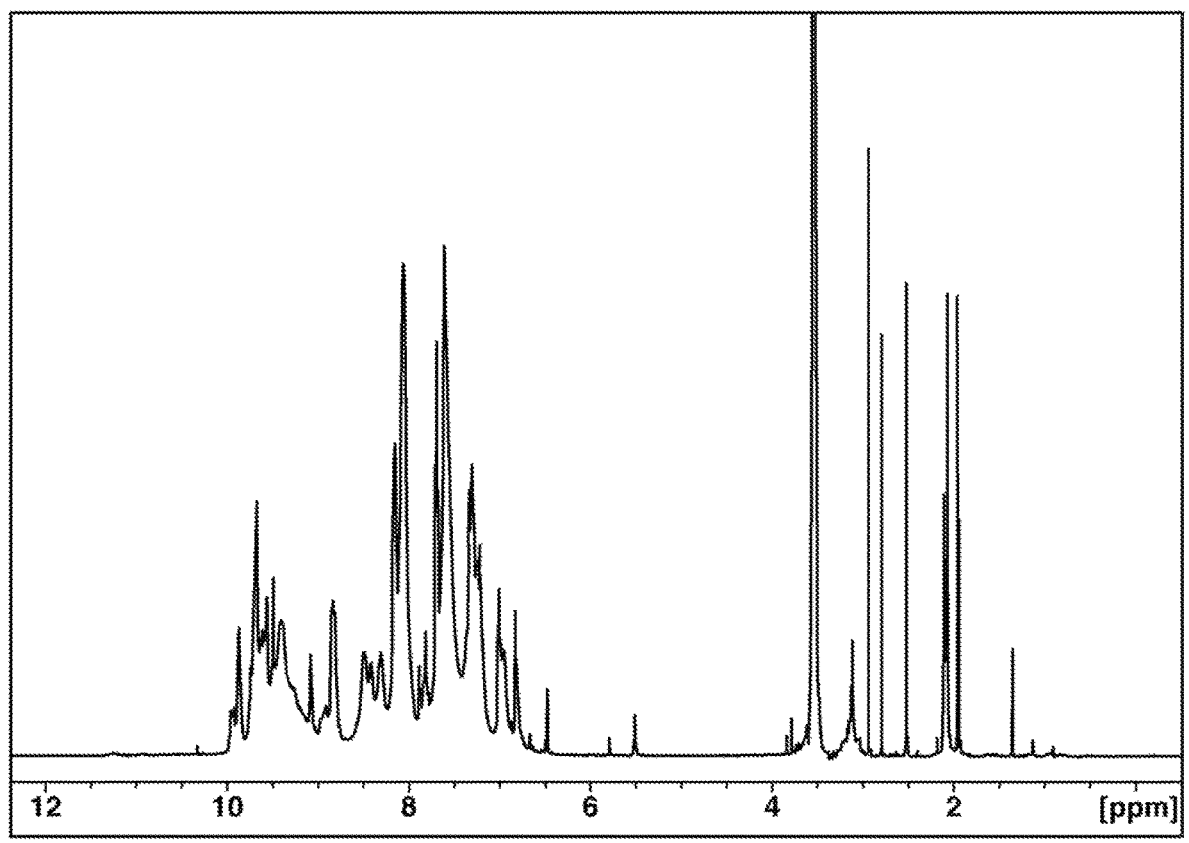

TRIAZINE RING-CONTAINING POLYMER, AND COMPOSITION FOR FILM FORMATION USE CONTAINING SAME

TECHNICAL FIELD

The present invention relates to a triazine ring-containing polymer and a film-forming composition containing same.

BACKGROUND ART

In recent years, there is an increasing demand for highly-functional polymer materials upon development of electronic devices such as liquid-crystal displays, organic electroluminescence (EL) displays, touch panels, optical semiconductor (LED) devices, solid-state image sensors, organic thin-film solar cells, dye-sensitized solar cells, and organic thin-film transistors (TFTs).

Required specific properties include 1) heat resistance, 2) transparency, 3) high refractive index, 4) high solubility, 5) low volume shrinkage rate, 6) high temperature and humidity resistance, 7) high film hardness, and so on.

In view of these, the present inventors have already found that polymers, each of which includes a recurring unit having a triazine ring and an aromatic ring, have a high refractive index, can achieve by themselves high heat resistance, high transparency, high refractive index, high solubility and low volume shrinkage rate, and are suited as film-forming compositions upon fabrication of electronic devices (Patent Document 1).

For spacers, insulating films, protective films or the like in liquid-crystal display devices, it is common to use a composition with a high refractive material dissolved in an organic solvent and to prepare thin films by a coating method. Depending on the kind of transparent conductive films, however, a high-polarity solvent cannot be used. Especially with transparent conductive films which use metal nanowires and have found wide spread utility recently, binders for the metal nanowires may be dissolved out by high-polarity solvents.

On the other hand, low-polarity solvents and the like may be used as line cleaning solvents for coating apparatus after film forming compositions which contain highly-refractive polymers are applied by using the coating apparatus. If a polymer has low solubility in such a solvent, a problem may arise in that a production line may be clogged.

PRIOR ART DOCUMENTS

Patent Documents

Patent Document 1: WO 2010/128661

SUMMARY OF THE INVENTION

Problems to be Solved by the Invention

It is therefore an object of the present invention to provide a triazine ring-containing polymer, which can form a thin film of high refractive index and excellent transparency and has excellent solubility in various organic solvents such as low-polarity solvents, hydrophilic solvents and low-boiling solvents, and also a film-forming composition containing the triazine ring containing polymer.

Means for Solving the Problems

The inventors have conducted extensive investigations in order to achieve the above objects. As a result, they have discovered that a triazine ring-containing polymer having a terminal triazine ring, at least a portion of which is capped with a fluorine-containing arylamino group, has excellent solubility in various organic solvents and can form a thin film of high refractive index and excellent transparency.

Accordingly, the invention provides:

1. A triazine ring-containing polymer characterized by including a recurring unit structure of formula (1) below and at least one terminal triazine ring, wherein at least a portion of the terminal triazine ring is capped with a fluorine-containing arylamino group:

[Chemical Formula 1]

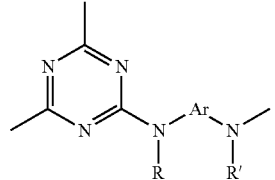

(1)

In the formula, R and R' each independently represent a hydrogen atom, an alkyl group, an alkoxy group, an aryl group, or an aralkyl group, and Ar represents at least one moiety selected from the group consisting of moieties of formulas (2) to (13) below:

[Chemical Formula 2]

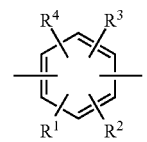

(2)

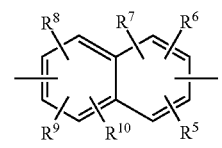

(3)

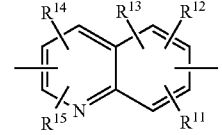

(4)

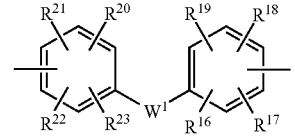

(5)

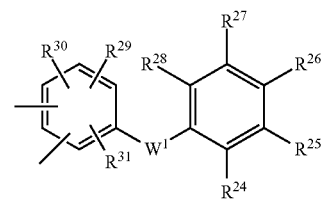

(6)

-continued

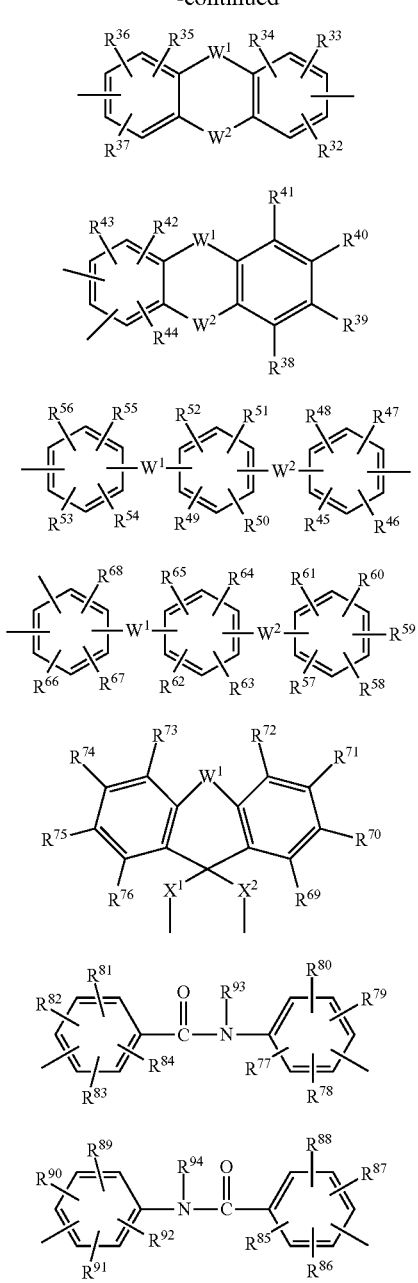

In the formulas, $R^1$ to $R^{92}$ each independently represent a hydrogen atom, a halogen atom, a carboxyl group, a sulfo group, a linear or branched alkyl group having 1 to 10 carbons, or a linear or branched alkoxy group having 1 to 10 carbons, $R^{93}$ and $R^{94}$ each independently represent a hydrogen atom, or a linear or branched alkyl group having 1 to 10 carbons, $W^1$ and $W^2$ each independently represent a single bond, $CR^{95}R^{96}$ in which $R^{95}$ and $R^{96}$ each independently represent a hydrogen atom or a linear or branched alkyl group having 1 to 10 carbons, with the proviso that $R^{95}$ and $R^{96}$ may be fused together to form a ring, C=O, O, S, SO, $SO_2$, or $NR^{97}$ in which $R^{97}$ represents a hydrogen atom or a linear or branched alkyl group having 1 to 10 carbons, and $X^1$ and $X^2$ each independently represent a single bond, a linear or branched alkylene group having 1 to 10 carbons, or a group of formula (14) below:

[Chemical Formula 3]

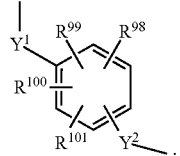

(14)

In the formula, $R^{98}$ to $R^{101}$ each independently represent a hydrogen atom, a halogen atom, a carboxyl group, a sulfo group, a linear or branched alkyl group having 1 to 10 carbons, or a linear or branched alkoxy group having 1 to 10 carbons, and $Y^1$ and $Y^2$ each independently represent a single bond, or a linear or branched alkylene group having 1 to 10 carbons;

2. The triazine ring-containing polymer of I above, wherein $R^1$ to $R^{92}$ and $R^{98}$ to $R^{101}$ are each a hydrogen atom;

3. The triazine ring-containing polymer of 1 or 2 above, wherein the fluorine-containing arylamino group has formula (15):

[Chemical Formula 4]

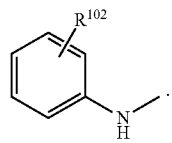

(15)

In the formula, $R^{102}$ represents a fluorine atom or a fluoroalkyl group having 1 to 10 carbons;

4. The triazine ring-containing polymer of 3 above, wherein the fluorine-containing arylamino group has formula (16):

[Chemical Formula 5]

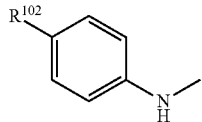

(16)

In the formula, $R^{102}$ has the same meaning as defined above;

5. The triazine ring-containing polymer of 3 or 4 above, wherein $R^{102}$ is a perfluoroalkyl group having 1 to 10 carbons;

6. The triazine ring-containing polymer of any one of 1 to 5 above, wherein Ar has formula (17):

[Chemical Formula 6]

(17)

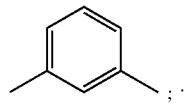

7. A film-forming composition which includes
the triazine ring-containing polymer of any one of 1 to 6 above and
an organic solvent;
8. The film-forming composition of 7 above, wherein the organic solvent is at least one selected from the group consisting of glycol ester solvents, ketone solvents and ester solvents;
9. The film-forming composition of 7 or 8 above, further including
a crosslinking agent;
10. The film-forming composition of 9 above, wherein the crosslinking agent is a polyfunctional (meth)acrylic compound;
11. A thin film obtained from the film-forming composition of any one of 7 to 10 above;
12. An electronic device having
a substrate and
the thin film of 11 above formed on the substrate; and
13. An optical member having
a substrate and
the thin film of 11 above formed on the substrate.

Advantageous Effects of the Invention

According to the present invention, it is possible to provide a triazine ring-containing polymer, which can form a thin film of high refractive index and excellent transparency and has excellent solubility in various organic solvents such as low-polarity solvents, hydrophilic solvents and low-boiling solvents.

In general, the refractive index of a compound is known to have a decreasing tendency when at least one fluorine atoms are introduced therein. The triazine ring-containing polymer of the present invention still retains a refractive index higher than 1.7 despite the introduction of such fluorine atom or atoms therein.

As the use of the triazine ring-containing polymer of the present invention makes it possible to formulate a composition by using an organic solvent of low dissolving capability such as a low-polarity solvent or a hydrophilic solvent, a thin film can be formed without problem even on a substrate which is prone to erosion by a high-polarity solvent.

Thin films prepared from the film-forming composition of the present invention can exhibit properties such as high heat resistance, high refractive index and low volume shrinkage rate, and therefore can be suitably used in the fields of electronic devices and optical members, such as members upon fabrication of liquid-crystal displays, organic electroluminescence (EL) displays, touch panels, optical semiconductor (LED) devices, solid-state imago sensors, organic thin-film solar cells, dye-sensitized solar cells, organic thin-film transistors (TFTs), lenses, prisms, cameras, binoculars, microscopes and semiconductor exposure systems.

In particular, the thin films prepared from the film-forming composition of the present invention are high in transparency and also high in refractive index, so that their use as protective films for transparent conductive films of ITO or silver nanowires can improve their visibility and can suppress their deteriorations.

BRIEF DESCRIPTION OF THE DRAWING

FIG. 1 is a $^1$H-NMR spectrum diagram of a polymeric compound [4] obtained in Example 1-1.

EMBODIMENT FOR CARRYING OUT THE INVENTION

The present invention will hereinafter be described in further detail.

The triazine ring-containing polymer according to the present invention contains a recurring unit structure represented by the following formula (1).

[Chemical Formula 7]

(1)

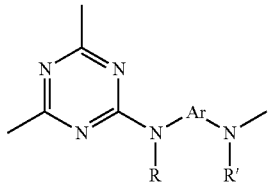

In the formula described above, R and R' each independently represent a hydrogen atom, an alkyl group, an alkoxy group, an aryl group, or an aralkyl group, but from the viewpoint of providing a higher refractive index, may be both preferably a hydrogen atom.

In the present invention, the number of carbons in the alkyl group is not particularly limited, but preferably 1 to 20, with 1 to 10 being more preferred from 1 to 3 being even more preferred from the viewpoint of providing the resulting polymer with still higher heat resistance. The alkyl group may have a linear, branched or cyclic structure.

Specific examples of the alkyl group may include methyl, ethyl, n-propyl, isopropyl, cyclopropyl, n-butyl, isobutyl, s-butyl, t-butyl, cyclobutyl, 1-methylcyclopropyl, 2-methylcyclopropyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, cyclopentyl, 1-methylcyclobutyl, 2-methylcyclobutyl, 3-methylcyclobutyl, 1,2-dimethylcyclopropyl, 2,3-dimethylcyclopropyl, 1-ethylcyclopropyl, 2-ethylcyclopropyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, cyclohexyl, 1-methylcyclopentyl, 2-methylcyclopentyl, 3-methylcyclopentyl, 1-ethylcyclobutyl, 2-ethylcyclobutyl, 3-ethylcyclobutyl, 1,2-dimethylcyclobutyl, 1,3-dimethylcyclobutyl, 2,2-dimethylcyclobutyl, 2,3-dimethylcyclobutyl, 2,4-dimethylcyclobutyl, 3,3-dimethylcyclobutyl, 1-n-propylcyclopropyl, 2-n-propylcyclopropyl, 1-isopropylcyclopropyl, 2-isopropylcyclopropyl, 1,2,2-trimethylcyclopropyl, 1,2,3-trimethylcyclopropyl, 2,2,3-trimethylcyclopropyl, 1-ethyl-2-methylcyclopropyl, 2-ethyl-1-methylcyclopropyl, 2-ethyl-2-methylcyclopropyl and 2-ethyl-3-methylcyclopropyl.

The number of carbons in the alkoxy group is not particularly limited, but preferably 1 to 20, with having 1 to 10 carbons being more preferred and 1 to 3 being even more preferred from the viewpoint of providing a polymer of still higher heat resistance. The alkyl moiety of the alkoxy group may have a linear, branched or cyclic structure.

Specific examples of the alkoxy group may include methoxy, ethoxy, n-propoxy, isopropoxy, n-butoxy, isobutoxy, s-butoxy, t-butoxy, n-pentoxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, n-hexyloxy, 1-methyl-n-pentyloxy, 2-methyl-n-pentyloxy, 3-methyl-n-pentyloxy, 4-methyl-n-pentyloxy, 1,1-dimethyl-n-butoxy, 1,2-dimethyl-n-butoxy, 1,3-dimethyl-n-butoxy, 2,2-dimethyl-n-butoxy, 2,3-dimethyl-n-butoxy, 3,3-dimethyl-n-butoxy, 1-ethyl-n-butoxy, 2-ethyl-n-butoxy, 1,1,2-trimethyl-n-propoxy, 1,2,2-trimethyl-n-propoxy, 1-ethyl-1-methyl-n-propoxy and 1-ethyl-2-methyl-n-propoxy.

The number of carbons in the aryl group is not particularly limited, but preferably 6 to 40, with having 6 to 16 being more preferred and 6 to 13 being even more preferred from the viewpoint of providing the resulting polymer with still higher heat resistance.

Specific examples of the aryl group may include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl and 9-phenanthryl.

The number of carbons in the aralkyl group is not particularly limited, but preferably having 7 to 20 carbons. The alkyl moiety of the aralkyl group may have a linear, branched or cyclic structure.

Specific examples of the aralkyl group may include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl and α-naphthylmethyl.

Ar represents at least one moiety selected from the group consisting of moieties represented by the following formulas (2) to (13):

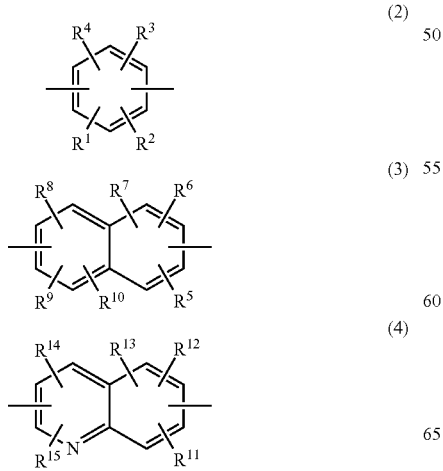

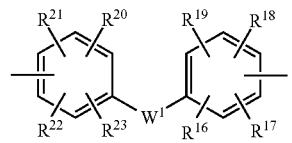

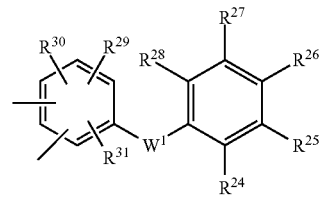

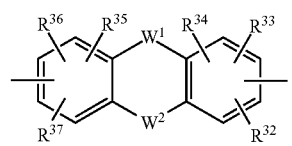

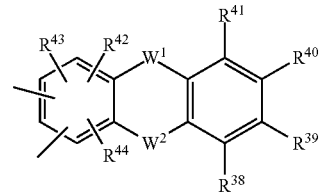

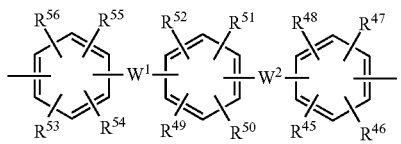

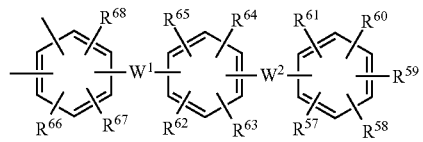

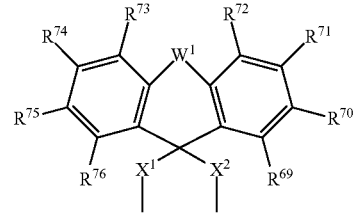

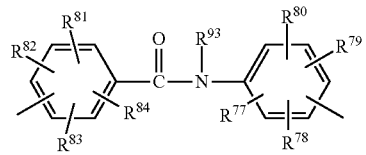

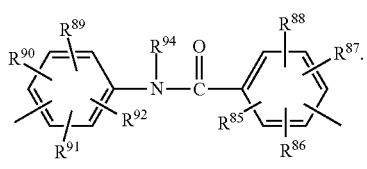

$R^1$ to $R^{92}$ each independently represent a hydrogen atom, a halogen atom, a carboxyl group, a sulfo group, a linear or branched alkyl group having 1 to 10 carbons, or a linear or to branched alkoxy group having 1 to 10 carbons, $R^{93}$ and $R^{94}$ each independently represent a hydrogen atom, or a linear or branched alkyl group having 1 to 10 carbons, $W^1$ and $W^2$ each independently represent a single bond, $CR^{95}R^{96}$ in which $R^{95}$ and $R^{96}$ each independently represent a hydrogen atom or a linear or branched alkyl group having 1 to 10 carbons, with the proviso that $R^{95}$ and $R^{96}$ may be fused together to form a ring, C=O, O, S, SO, $SO_2$, or $NR^{97}$ in which $R^{97}$ represents a hydrogen atom or a linear or branched alkyl group having 1 to 10 carbons.

Examples of the halogen atom may include fluorine, chlorine, bromine and iodine.

As these alkyl groups and alkoxy groups, those which are similar to the above-described ones may be mentioned.

$X^1$ and $X^2$ are each independently a single bond, a linear or branched alkylene group of 1 to 10 carbons, or a group represented by the formula (14) below:

[Chemical Formula 9]

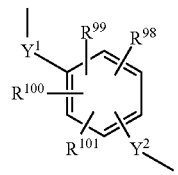

(14)

$R^{98}$ to $R^{101}$ each independently represent a hydrogen atom, a halogen atom, a carboxyl group, a sulfo group, a linear or branched alkyl group having 1 to 10 carbons, or a linear or branched alkoxy group having 1 to 10 carbons, and $Y^1$ and $Y^2$ each independently represent a single bond, or a linear or branched alkylene group having 1 to 10 carbons. As these halogen atom, alkyl group and alkoxy group, those which are similar to the above-described ones may be mentioned.

Specific examples of the linear or branched alkylene group having 1 to 10 carbons may include methylene, ethylene, propylene, trimethylene, tetramethylene and pentamethylene.

Among these, $R^1$ to $R^{92}$ and $R^{98}$ to $R^{101}$ may each preferably be a hydrogen atom, a halogen atom, a linear or branched alkyl group having 1 to 5 carbons, or a linear or branched alkoxy group having 1 to 5 carbons, with a hydrogen atom being more preferred.

In particular, Ar may be preferably at least one moiety selected from the group consisting of moieties represented by the formulas (2) and (5) to (13), and more preferably at least one moiety selected from the group consisting of the formulas (2), (5), (7), (8) and (11) to (13). Specific examples of aryl groups represented by the formulas (2) to (13) may include, but are not limited to, those represented by the following formulas:

[Chemical Formula 10]

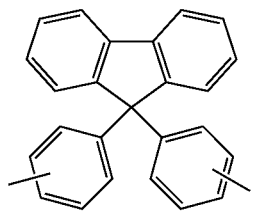

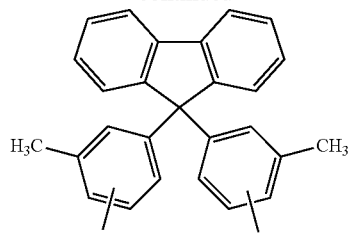

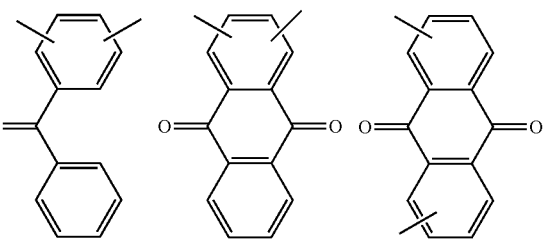

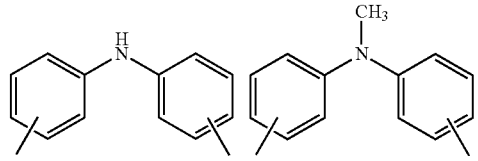

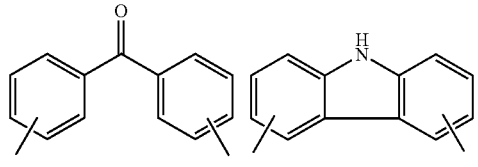

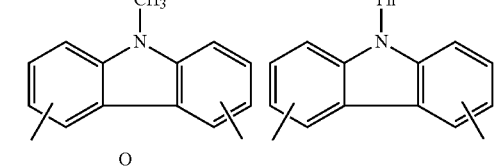

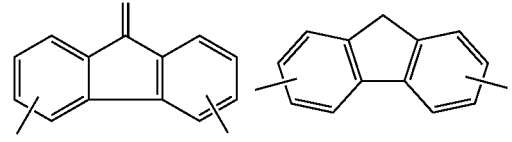

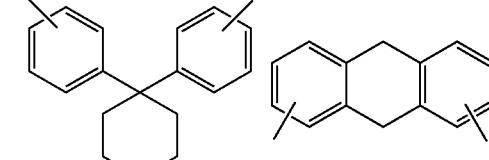

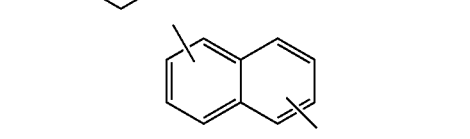

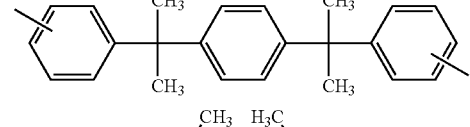

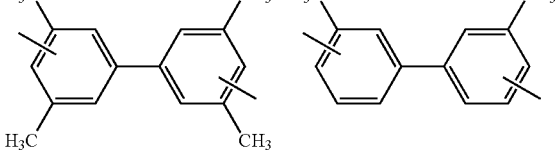

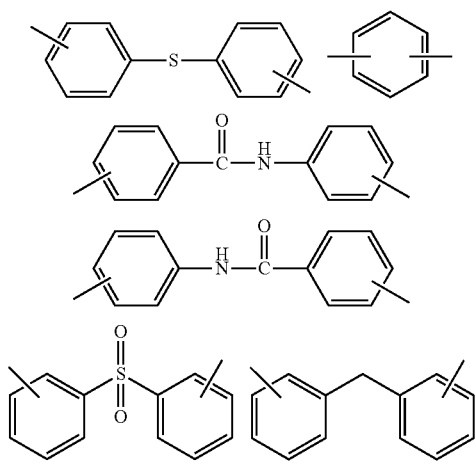

Of these, aryl groups represented by the formulas below are more preferred for the availability of polymers of even higher refractive indices.

[Chemical Formula 11]

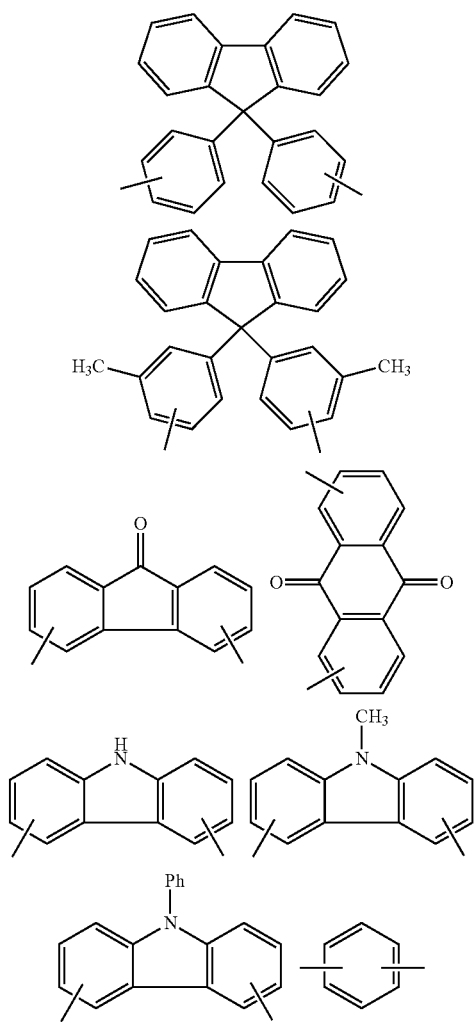

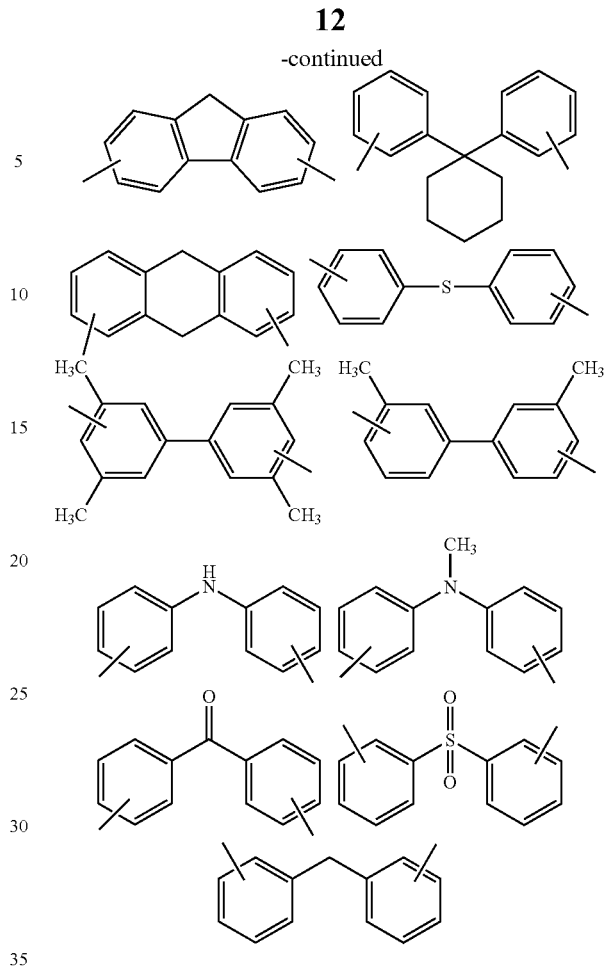

Especially from the viewpoint of providing the triazine ring-containing polymer with still higher solubility in organic solvents such as low-polarity solvents, an m-phenylene group represented by the following formula (17) is preferred as Ar.

[Chemical Formula 12]

(17)

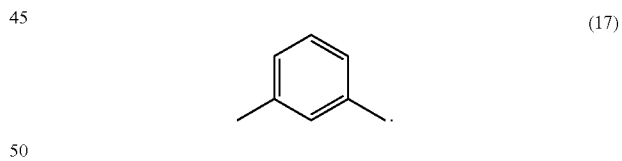

The triazine ring-containing polymer of the present invention has at least one terminal triazine ring, and at least a portion of the terminal triazine ring is capped with a fluorine-containing arylamino group.

Examples of each aryl group may include those which are similar to the aryl groups exemplified above, with a phenyl group being particularly preferred.

Examples of each fluorine-containing group include a fluorine atom and fluorine-containing hydrocarbon groups such as fluoroalkyl groups, with a fluorine atom and fluoroalkyl groups having 1 to 10 carbons being preferred.

The fluoroalkyl groups having 1 to 10 carbons may be linear, branched or cyclic. Specific examples may include trifluoromethyl, pentafluoroethyl, 2,2,2-trifluoroethyl, heptafluoropropyl, 2,2,3,3,3-pentafluoropropyl, 2,2,3,3-tetrafluoropropyl, 2,2,2-trifluoro-1-(trifluoromethyl)ethyl, nonafluorobutyl, 4,4,4-trifluorobutyl, undecafluoropentyl, 2,2,33,4,4,5,5,5-nonafluoropentyl, 2,2,3,3,4,4,5,5-octafluoropentyl, tridecafluorohexyl, 2,2,3,3,4,4,5,5,6,6,6-undecafluorohexyl, 2,3,3,4,4,5,5,6,6-decafluorohexyl, and 3,3,4,4,5,5,6,6,6-nonafluorohexyl.

Especially from the viewpoint of increasing the solubility of the triazine ring-containing polymer in a low-polarity solvent or the like while maintaining the refractive index, perfluoroalkyl groups having 1 to 10 carbons are preferred, perfluoroalkyl groups having 1 to 5 carbons are more preferred, and a trifluoromethyl group is most suited.

The number of fluorine-containing groups is not particularly limited, and can be a desired number of fluorine-containing groups that can substitute on an aryl group. In view of the balance between the maintenance of the refractive index and the solubility, however, the number of fluorine-containing groups may be preferably 1 to 4, more preferably 1 to 2, even more preferably one.

Examples of suitable fluorine-containing arylamino groups may include preferably those represented by the following formula (15), notably those represented by the following formula (16) that has a fluorine-containing group at a position para to the amino group.

[Chemical Formula 13]

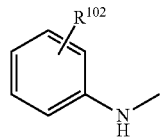

(15)

In the formula, $R^{102}$ represents a fluorine atom or a fluoroalkyl group having 1 to 10 carbons.

[Chemical Formula 14]

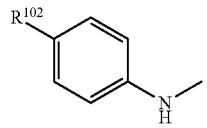

(16)

In the formula, $R^{102}$ has the same meaning as described above.

Specific fluorine-containing arylamino groups may include, but are not limited to, those represented by the following formulas.

[Chemical Formula 15]

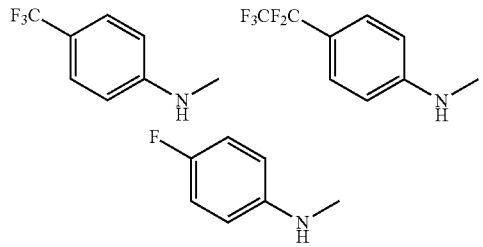

Fluorine-containing arylamino groups can be introduced using a corresponding fluorine-containing arylamino compound in a production process to be described subsequently herein.

Specific examples of such a fluorine-containing arylamino compound may include 4-fluoroaniline, 4-trifluoromethylaniline, and 4-pentafluoroethylaniline.

In the present invention, particularly suitable triazine ring-containing polymers may include those represented by the following formulas (18) to (21).

[Chemical Formula 16]

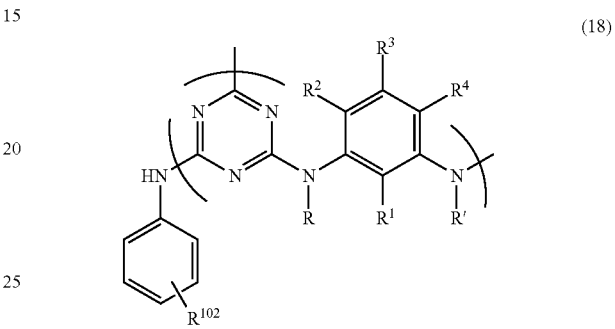

(18)

In the formula, R, R', $R^1$ to $R^4$ and $R^{102}$ have the same meanings as described above.

[Chemical Formula 17]

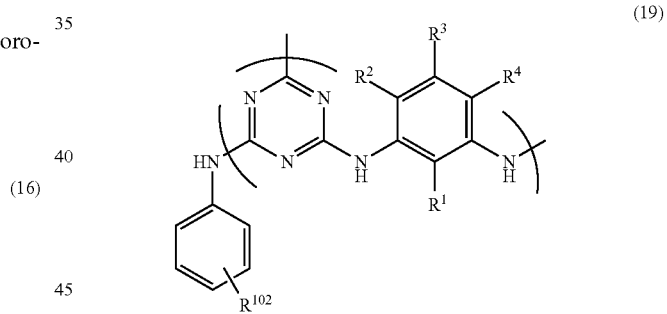

(19)

In the formula, $R^1$ to $R^4$ and $R^{102}$ has the same meaning as described above.

[Chemical Formula 18]

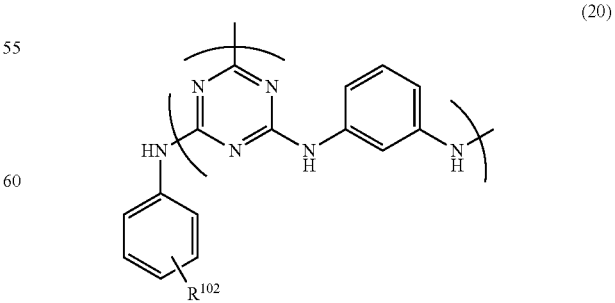

(20)

In formula, $R^{102}$ has the same meaning as described above.

[Chemical Formula 19]

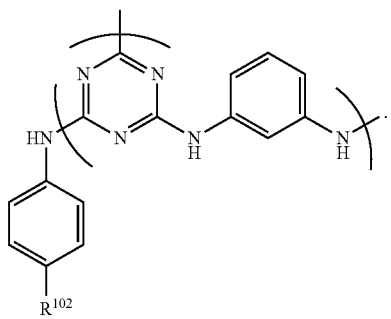

(21)

In the formula, $R^{102}$ has the same meaning as described above.

The weight-average molecular weight of the polymer in the present invention is not particularly limited, but may be preferably 500 to 500,000, more preferably 500 to 100,000. The weight-average molecular weight may be preferably at least 2,000 from the standpoint of further improving the heat resistance and lowering the shrinkage rate, but may be preferably up to 50,000, more preferably up to 30,000, even more preferably up to 10,000 from the standpoint of further increasing the solubility and lowering the viscosity of a solution to be obtained.

The weight-average molecular weight in the present invention means a weight-average molecular weight measured by gel permeation chromatography (GPC) against a polystyrene standard.

The triazine ring-containing polymer (hyperbranched polymer) of the present invention can be prepared following the method disclosed in Patent Document 1 described above.

For example, as illustrated by Scheme 1 below, the triazine ring-containing polymer (20) can be obtained by reacting a triazine compound (22) and an aryldiamino compound (23) in a suitable organic solvent and then reacting the resulting reaction product with a fluorine-containing aniline compound (24) as an end-capping agent.

Scheme 1

[Chemical Formula 20]

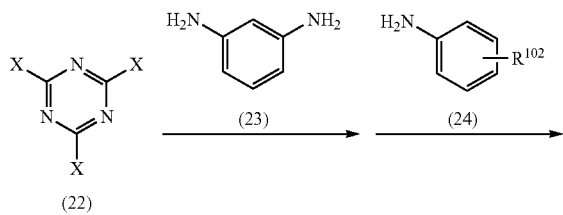

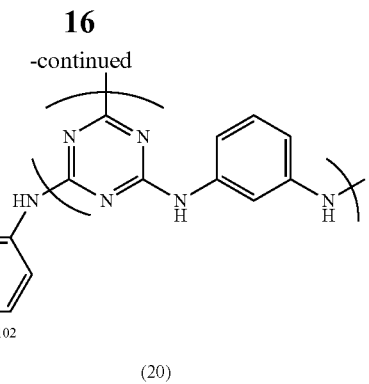

(20)

In the formula, Xs each independently represent a halogen atom, and $R^{102}$ has the same meaning as described above.

In the above-described reaction, the charge ratio of the aryldiamino compound (23) to the triazine compound (22) is optional insofar as the target polymer is obtained, but the amount of the aryldiamino compound (23) to be charged may be preferably 0.01 to 10 equivalents, more preferably 1 to 5 equivalents per equivalent of the triazine compound (22).

The aryl diamino compound (23) may be added neat or may be added in the form of a solution in an organic solvent. However, in view of the ease of operation and the controllability of the reaction, the latter method is preferred.

The reaction temperature may be suitably as desired in the range of the melting point to the boiling point of the solvent to be used. Especially, however, the temperature may be preferably approximately −30° C. to 150° C., more preferably −10° C. to 100° C.

As the organic solvent, various solvents that are commonly used in this type of reactions to be used. Examples may include tetrahydrofuran, dioxane, dimethyl sulfoxide; amide solvents such as N,N-dimethylformamide, N-methyl-2-pryrrolidone, tetramethylurea, hexamethylphosphoramide, N,N-dimethylacetamide, N-methyl-2-piperidone, N,N-dimethylethyleneurea, N,N,N',N'-tetramethylmalonamide, N-methylcaprolactam, N-acetylpyrrolidine, N,N-diethylacetamide, N-ethyl-2-pyrrolidine, N,N-dimethylpropionamide, N,N-dimethylisobutylamide, N-methylformamide and N,N'-dimethylpropyleneurea; and mixed solvents thereof.

Of the above, N,N-dimethylformamide, dimethyl sulfoxide, N-methyl-2-pyrrolidone, N,N-dimethylacetamide, and mixed solvents thereof are preferred, with N,N-dimethylacetamide and N-methyl-2-pyrrolidone being especially suited.

In the reaction of the first stage in Scheme 1, desired one of various bases commonly used during or after polymerization may be added.

Specific examples of such bases may include potassium carbonate, potassium hydroxide, sodium carbonate, sodium hydroxide, sodium hydrogen carbonate, sodium ethoxide, sodium acetate, lithium carbonate, lithium hydroxide, lithium oxide, potassium acetate, magnesium oxide, calcium oxide, barium hydroxide, trilithium phosphate, trisodium phosphate, tripotassium phosphate, cesium fluoride, aluminum oxide, ammonia, n-propylamine, trimethylamine, triethylamine, diisopropylamine, diisopropylethylamine, N-methylpiperidine, 2,2,6,6-tetramethyl-N-methylpiperidine, pyridine, 4-dimethylaminopyridine and N-methylmorpholine.

The amount of the base to be added is preferably 1 to 100 equivalents, more preferably 1 to 10 equivalents per equivalent of the triazine compound (22). These bases may be used in the form of an aqueous solution.

The resulting polymer may preferably be free of any remaining starting ingredients, but some portions of the starting ingredients may remain in the resulting polymer unless the advantageous effects of the present invention are impaired.

After completion of the reaction, the product can be easily purified by reprecipitation or the like.

As the end capping method using the fluorine atom-containing aniline compound (24), a known method may be adopted.

In this method, the amount of the end-capping agent to be used may be preferably approximately 0.05 to 10 equivalents more preferably 0.1 to 5 equivalents, even more preferably 0.5 to 2 equivalents per equivalent to halogen atoms originated from an excess portion of the triazine compound, which has not been used in the polymerization reaction.

As the reaction solvent and reaction temperature, similar conditions as described in connection with the reaction of the first stage in Scheme 1 described above can be mentioned, and the end-capping agent may be charged concurrently with the aryldiamino compound (23).

The end capping may not conducted with at least two kinds of groups by using a fluorine-free arylamino compound. As the aryl group in this substituent-free arylamino compound, those which are similar to the ones described above can be mentioned.

The triazine ring-containing polymer of the present invention described above can be suitably used as a film-forming composition, to which a crosslinking agent may be added.

No particular limitation is imposed on the crosslinking agent insofar as it is a compound containing substituent groups capable of reacting with the above-mentioned triazine ring-containing polymer.

Examples of such compounds may include melamine compounds having crosslink-forming substituent groups such as methylol groups or methoxymethyl groups, substituted urea compounds, compounds containing crosslink-forming substituent groups such as epoxy groups or oxetane groups, compounds containing blocked isocyanate groups, compounds containing a group or groups of acid anhydrides, compounds having (meth)acrylic groups, and phenoplast compounds. From the viewpoint of heat resistance and storage stability, compounds containing epoxy groups, blocked isocyanate groups or (meth)acrylic groups are preferred. In particular, compounds having blocked isocyanate groups, and polyfunctional epoxy compounds and/or polyfunctional (meth)acrylic compounds, the polyfunctional epoxy compounds and polyfunctional (meth)acrylic compounds being capable of providing light-curable compositions even without any polymerization initiator, are preferred.

These compounds need to contain at least one crosslink-forming substituent group when they are used for the end capping treatment of polymers, but need to contain at least two crosslink-forming substituent groups when they are used for the crosslinking treatment of polymers themselves.

No particular limitation is imposed on the polyfunctional epoxy compound insofar as it has at least two epoxy groups per molecule.

Specific examples may include tris(2,3-epoxypropyl) isocyanurate, 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxyl)phenyl]propane, 1,2-cyclohexanedicarboxylate diglycidyl ester, 4,4'-methylenebis(N,N-diglycidylaniline), 3,4 epoxycyclohexylmethyl-3,4-epoxycyclohexane carboxylate, trimethylolethane triglycidyl ether, bisphenol-A-diglycidyl ether, and pentaerythritol polyglycidyl ether.

Usable commercial products may include YH-434 and YH-434L (products of Tohto Kasei Co., Ltd.), epoxy resins having at least two epoxy groups; EPOLEAD GT-401, GT-403, GT-301 and GT-302, and CELLOXIDE 2021 and 3000 (products of Daicel Chemical Industries, Ltd.), epoxy resins having a cyclohexene oxide structure; EPIKOTE (now "jER") 1001, 1002, 1003, 1004, 1007, 1009, 1010 and 828 (products of Japan Epoxy Resin Co., Ltd.), bisphenol A-type epoxy resins; EPIKOTE (now "jER") 807 (product of Japan Epoxy Resin Co., Ltd.), a bisphenol F epoxy resin; EPIKOTE (now "jER") 152 and 154 (products of Japan Epoxy Resin Co., Ltd.) and EPPN 201 and 202 (products of Nippon Kayaku Co., Ltd.), all, phenol-novolak epoxy resins; EOCN-102, 103S, 104S, 1020, 1025 and 1027 (products of Nippon Kayaku Co., Ltd.), and EPIKOTE (now "jER") 180S75 (product of Japan Epoxy Resin Co., Ltd.), all, cresol-novolak epoxy resins; DENACOL EX-252 (product of Nagase ChemteX Corporation), CY175, CY177 and CY179 (products of Ciba-Geigy AG), ARALDITE CY-182, CY-192 and CY-184 (products of Ciba-Geigy AG), EPICULON 200 and 400 (products of DIC Corporation), EPIKOTE (now "jER") 871 and 872 (products of Japan Epoxy Resin Co., Ltd.), and ED-5661 and ED-5662 (products of Celanese Coating Company), all, alicyclic epoxy resins; and DENACOL EX-611, EX-612, EX-614, EX-622, EX-411, EX-512, EX-522, EX-421, EX-313, EX-314 and EX-321 (products of Nagase ChemteX Corporation), aliphatic polyglycidyl ethers.

No particular limitation is imposed on the polyfunctional (meth)acrylic compound insofar as it has at least two (meth)acrylic groups per molecule.

Specific examples may include ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylolpropane triacrylate, ethoxylated trimethylolpropane trimethacrylate, ethoxylated glycerol triacrylate, ethoxylated glycerol trimethacrylate, ethoxylated pentaerythritol tetraacrylate, ethoxylated pentaerythritol tetramethacrylate, ethoxylated dipentaerythritol hexaacrylate, polyglycerol monoethylene oxide polyacrylate, polyglycerol polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylolpropane triacrylate, trimethylolpropane trimethacrylate, tricyclodecane dimethanol diacrylate, tricyclodecane dimethanol dimethacrylate, 1,6-hexanediol diacrylate, 1,6-hexanediol dimethacrylate, and polybasic acid-modified acrylic oligomers.

These polyfunctional (meth)acrylic compounds are available as commercial products. Their specific examples may include NK Ester A-200, A-400, A-600, A-1000, A-9300 (tris(2-acryloyloxyethyl) isocyanurate), A-9300-1CL, A-TMPT, UA-53H, 1G, 2G, 3G, 4G, 9G, 140, 23G, ABE-300, A-BPE-4, A-BPE-6, A-BPE-10, A-BPE-20, A-BPE-30, BPE-80N, BPE-100N, BPE-200, BPE-500, BPE-900, BPE-1300N, A-GLY-3E, A-GLY-9E, A-GLY-20E, A-TMPT-3EO, A-TMPT-9EO, AT-20E, ATM-4E, ATM-35E, (all, products of Shin-Nakamura Chemical Co., Ltd.); KAYARAD (registered trademark) DPEA-12, PEG400DA, THE-330, RP-1040 (all, products of Nippon Kayaku Co., Ltd.);

ARONIX M-210, M-350 (both, products of Toagosei Co., Ltd.); KAYARAD (registered trademark) DPHA, NPGDA, PET30 (all, products of Nippon Kayaku Co., Ltd.); NK Ester A-DPH, A-TMPT, A-DCP, A-HD-N, TMPT, DCP, NPG, HD-N (all, products of Shin-Nakamura Chemical Co., Ltd.); NK Oligo U-15HA (product of Shin-Nakamura Chemical Co., Ltd.); NK Polymer Vanaresin GH-1203 (product of Shin-Nakamura Chemical Co., Ltd.); and DN-0075 (product of Nippon Kayaku Co., Ltd.).

The above-described polybasic acid-modified acrylic oligomers are also available as commercial products, and their specific examples include ARONIX M-510, 520 (both, products of Toagosei Co., Ltd.).

No particular limitation is imposed on the acid anhydrides insofar as they are each a carboxylic acid anhydride obtained by subjecting of two molecules of a carboxylic acid to dehydrating condensation. Their specific examples may include those having one acid anhydride group per molecule, such as phthalic anhydride, tetrahydrophthalic anhydride, hexahydrophthalic anhydride, methyl tetrahydrophthalic anhydride, methyl hexahydrophthalic anhydride, nadic anhydride, methyl nadic anhydride, maleic anhydride, succinic anhydride, octyl succinic anhydride and dodecenyl succinic anhydride; and those having two acid anhydride groups per molecule, such as 1,2,3,4-cyclobutanetetracarboxylic dianhydride, pyromellitic anhydride, 3,4-dicarboxy-1,2,3,4-tetrahydro-1-naphthalenesuccinic dianhydride, bicyclo[3.3.0]octane-2,4,6,8-tetracarboxylic dianhydride, 5-(2,5-dioxotetrahydro-3-furanyl)-3-methyl-3-cyclohexene-1,2-dicarboxylic anhydride, 1,2,3,4-butanetetracarboxylic dianhydride, 3,3',4,4'-benzophenonetetracarboxylic dianhydride, 3,3',4,4'-biphenyltetracarboxylic dianhydride, 2,2-bis(3,4-dicarboxyphenyl)hexafluoropropane dianhydride and 1,3-dimethyl-1,2,3,4-cyclobutanetetracarboxylic dianhydride.

No particular limitation is imposed on the compounds containing one or more blocked isocyanate groups, insofar as they have at least two blocked isocyanate groups, in which each isocyanate group (—NCO) is blocked by a suitable protective group, per molecule, such protective groups (blocking moieties) are released through thermal dissociation when exposed to an elevated temperature during heat curing, and the resulting isocyanate groups induce a crosslinking reaction with the polymer. Examples may include compounds having, per molecule, at least two groups represented by the formula below, in which the groups may be the same or may be different from one another.

[Chemical Formula 21]

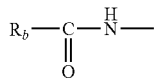

In the formula, Rb represents an organic group as a blocking moiety.

Such a compound can be obtained, for example, by reacting a suitable blocking agent with a compound having at least two isocyanate groups per molecule.

Examples of the compound having at least two isocyanate groups per molecule may include polyisocyanates such as isophorone diisocyanate, 1,6-hexamethylene diisocyanate, methylene bis(4-cyclohexyl isocyanate) and trimethylhexamethylene diisocyanate, and also dimers and trimers thereof as well as their reaction products with diols, triols, diamines or triamines.

Examples of the blocking agent may include alcohols such as methanol, ethanol, isopropanol, n-butanol, 2-ethoxyhexanol, 2-N,N-dimethylaminoethanol, 2-ethoxyethanol and cyclohexanol; phenols such as phenol, o-nitrophenol, p-chlorophenol, and o-, m- and p-cresol; lactams such as s-caprolactam; oximes such as acetone oxime, methyl ethyl ketone oxime, methyl isobutyl ketone oxime, cyclohexanone oxime, acetophenone oxime and benzophenone oxime; pyrazoles such as pyrazole, 3,5-dimethylpyrazole and 3-methylpyrazole; and thiols such as dodecanethiol and benzenethiol.

The compounds containing one or more blocked isocyanate groups are also available as commercial products. Specific examples may include B-830, B-815N, B-842N, B-870N, B-874N, B-882N, B-7005, B-7030, B-7075 and B-5010 (all, products of Mitsui Chemicals Polyurethane Co., Ltd.); DURANATE (registered trademark) 17B-60PX, TPA-B80E, MF-B60X, MF-K60X and E402-B80T (all, products of Asahi Kasei Chemicals Corporation); Karenz (registered trademark) MOI-BM (product of Showa Denko KK); and TRIXENE (registered trademark) BI-7950, BI-7951, BI-7960, BI-7961, BI-7963, BI-7982, BI-7991 and BI-7992 (products of Baxenden Chemicals Ltd.).

No particular limitation is imposed on the aminoplast compounds insofar as they have at least two methoxymethylene groups per molecule. Examples may include melamine compounds like CYMEL (registered trademark) series such as hexamethoxymethylmelamine (CYMEL (registered trademark) 303), tetrabutoxymethyl glycoluril (CYMEL (registered trademark) 1170), and tetramethoxymethyl benzoguanamine (CYMEL (registered trademark) 1123) (all, products of Nihon Cytec Industries, Inc.); and NIKALAC (registered trademark) series such as methylated melamine resins (NIKALAC (registered trademark) MW-30HM, MW-390, MW-100LM and MX-750LM), and methylated urea resins (NIKALAC (registered trademark) MX-270, MX-280 and MX-290) (all, products of Sanwa Chemical Co., Ltd.).

No particular limitation is imposed on the oxetane compounds insofar as they have at least two oxetanyl groups per molecule. Examples may include OXT-221, OX-SQ-H and OX-SC all of which contain oxetanyl groups (all, products of Toagosci Co., Ltd.).

The phenoplast compounds have at least two hydroxymethylene groups per molecule. Upon exposure to an elevated temperature during heat curing, a crosslinking reaction proceeds through a dehydrating condensation reaction with the polymer of the present invention.

Examples of the phenoplast compounds may include 2,6-dihydroxymethyl-4-methylphenol, 2,4-dihydroxymethyl-6-methylphenol, bis(2-hydroxy-3-hydroxymethyl-5-methylphenyl)methane, bis(4-hydroxy-3-hydroxymethyl-5-methylphenyl)methane, 2,2-bis(4-hydroxy-3,5-dihydroxymethylphenyl)propane, bis(3-formyl-4-hydroxyphenyl)methane, bis(4-hydroxy-2,5-dimethylphenyl)formylmethane, and a, c-bis(4-hydroxy-2, 5-dimethylphenyl)-4-formyltoluene.

These phenoplast compounds are also available as commercial products. Specific examples may include AV LIGHT 26DMPC, 46DMOC, DM-BIPC-F, DM-BIOC-F, TM-BIP-A, BISA-F, B125X-DF, and B125X-TPA (all, products of Asahi Organic Chemicals Industry Co., Ltd.).

Of these, polyfunctional (meth)acrylic compounds are preferred in that they can reduce a decrease of refractive index due to the incorporation of a crosslinking agent and they allow a curing reaction to proceed promptly. Among these preferred polyfunctional (meth)acrylic compounds, polyfunctional (meth)acrylic compounds having the below-described isocyanuric acid skeleton are more preferred for their excellent compatibility with the triazine ring-containing polymer.

Examples of polyfunctional (meth)acrylic compounds having such a skeleton may include NK Ester A-9300 and A-9300-1CL (both, products of Shin-Nakamura Chemical Co., Ltd.).

[Chemical Formula 22]

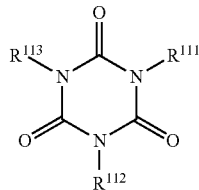

In the formula, $R^{111}$ to $R^{113}$ are each independently a monovalent organic group having at least one terminal (meth)acrylic group.

From the viewpoint of further improving the cure rate and providing the resulting cured film with enhanced solvent resistance, acid resistance and alkali resistance, it is suitable to use polyfunctional (meth)acrylic compounds (hereinafter referred to as "low-viscosity crosslinking agents"), which are liquid at 25° C. and have a viscosity of up to 5,000 mPa·s, preferably 1 to 3,000 mPa·s, more preferably 1 to 1,000 mPa·s, even more preferably 1 to 500 mPa·s, either singly or as a combination of at least two, or in combination with one or more of the above-described polyfunctional (meth)acrylic compound having the isocyanuric acid skeleton.

Such low-viscosity crosslinking agents are also available as commercial products. Examples may include, among the above-mentioned polyfunctional (meth)acrylic compounds, crosslinking agents having a relatively long chain length between (meth)acrylic groups, such as NK Ester A-GLY-3E (85 mPa·s at 25° C.), A-GLY-9E (95 mPa·s at 25° C.), A-GLY-20E (200 mPa·s at 25° C.), A-TMPT-3EO (60 mPa·s at 25° C.), A-TMPT-9EO, ATM-4E (150 mPa·s at 25° C.) and ATM-35E (350 mPa·s at 25° C.) (all, products of Shin-Nakamura Chemical Co., Ltd.).

In view of also providing the resulting cured film with improved alkali resistance, it is suited to use at least one of NK Ester A-GLY-20E (product of Shin-Nakamura Chemical Co., Ltd.) and NK Ester ATM-35E (product of Shin-Nakamura Chemical Co., Ltd.) in combination with one or more of the above-described polyfunctional (meth)acrylic compounds having the isocyanuric acid skeleton.

When a thin film of the triazine ring-containing polymer of the present invention Is laminated with a protective film of PET or a polyolefin and light is irradiated through the laminated protective film, the protective film with the thin film laminated thereon can exhibit good curability without being subjected to oxygen inhibition. As it is necessary to peel off the protective film after the curing, the use of a polybasic acid-modified acrylic oligomer is preferred for the availability of a thin film having good peelability.

The above-mentioned crosslinking agents may be used singly or in a combination of at least two. The amount of the crosslinking agent to be used per 100 parts by weight of the triazine ring-containing polymer may be preferably 1 to 100 parts by weight. In view of solvent resistance, the lower limit may be preferably 2 parts by weight, more preferably 5 parts by weight. From the standpoint of controlling the refractive index, the upper limit may be preferably 20 parts by weight, and more preferably 15 parts by weight.

In the composition of the present invention, a polymerization initiator may also be incorporated corresponding to the crosslinking agent included therein. As mentioned above, when a polyfunctional epoxy compound and/or a polyfunctional (meth)acrylic compound is used as a crosslinking agent, photocuring is allowed to proceed even without using any polymerization initiator, whereby a cured film is obtained. Even in such a situation, a polymerization initiator may be used without problem.

When a polyfunctional epoxy compound is used as a crosslinking agent, a photoacid generator or a photobase generator can be used.

Usable photoacid generators may be selected, as desired, from those known in the art. Usable examples may include onium salt derivatives such as diazonium salts, sulfonium salts and iodonium salts.

Specific examples may include aryldiazonium salts such as phenyldiazonium hexafluorophosphate, 4-methoxyphenyldiazonium hexafluoroantimonate and 4-methylphenyldiazonium hexafluorophosphate; diaryliodonium salts such as diphenyliodonium hexafluoroantimonate, di(4-methylphenyl)iodonium hexafluorophosphate and di(4-tert-butylphenyl)iodonium hexafluorophosphate; and triarylsulfonium salts such as triphenylsulfonium hexafluoroantimonate, tris(4, methoxyphenyl)sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio)phenylsulfide-bishexafluoroantimonate, 4,4'-bis(diphenylsulfonlo)phenylsulfide-bishexafluorphosphate, 4,4'-bis[di(β-hydroxyethoxy)phenylsulfonio]phenylsulfide-bishexafluoroantimonate, 4,4'-bis[di(β-hydroxyethoxy)phenylsulfonio]phenylsulfide-bis-hexafluorophosphate, 4-[4'-(benzoyl)phenylthio]phenyl-di(4-fluorophenyl)sulfonium hexafluoroantimonate and 4-[4'-(benzoyl)phenylthio]phenyl-di(4-fluorophenyl)sulfonium hexafluorophosphate.

As these onium salts, commercial products may be also used. Specific examples may include SAN-AID SI-60, SI-80, SI-100, SI-60L, SI-80L, SI-100L, SI-L145, SI-L150, SI-L160, SI-L110 and SI-L147 (all, products of Sanshin Chemical Industry Co., Ltd.); UVI-6950, UVI-6970, UVI-6974, UVI-6990 and UVI-6992 (all, products of Union Carbide Corporation); CPI-100P, CPI-100A, CPI-200K and CPI-200S (all, products of San-Apro Ltd.); Adeka Optomer SP-150, SP-151, SP-170 and SP-171 (products of Asahi Denka Kogyo K.K.); Irgacure 261 (product of BASF SE); CI-2481, CI-2624, CI-2639 and CI-2064 (all, products of Nippon Soda Co., Ltd.); CD-1010, CD-1011 and CD-1012 (product of Sartomer USA, LLC); DS-100, DS-101, DAM-101, DAM-102, DAM-105, DAM-201, DSM-301, NAI-100, NAI-101, NAI-105, NAT-106, SI-100, SI-101, SI-105, SI-106, PI-105, NDI-105, BENZOIN TOSYLATE, MBZ-101, MIZ-301, PYR-100, PYR-200, DNB-101, NB-101, NB-201, BBI-101, BBI-102, BBI-103 and BBI-109 (all, products of Midori Kagaku Co., Ltd.); PCI-061T, PCI-062T, PCI-020T and PCI-022T (products of Nippon Kayaku Co., Ltd.); and IBPF and IBCF (products of Sanwa Chemical Co., Ltd.).

On the other hand, usable photobase generators may also be selected, as desired, from those known in the art. Usable examples may include photobase generators of the Co-amine complex type, oxime carboxylic acid ester type, carbamic acid ester type and quaternary ammonium salt type.

Their specific examples include 2-nitrobenzylcyclohexyl carbamate, triphenylmethanol, O-carbamoylhydroxylamide, O-carbamoyloxime, [[(2,6-dinitrobenzyl)oxy]carbonyl]cyclohexylamine, bis[[(2-nitrobenzyl)oxy]carbonyl]hexane 1,6-damine, 4-(methylthiobenzoyl)-1-methyl-1-morpholinoethane, (4-morpholinobenzoyl)-1-benzyl-1-dimethylaminopropane, N-(2-nitrobenzyloxycarbonyl)pyrrolidine, hexamine cobalt(III) tris(triphenylmethylborate), 2-benzyl-2-dimethylamino-1-(4-morpholinophenyl)-butanone, 2,6-dimethyl-3,5-diacetyl-4-(2'-nitrophenyl)-1,4-dihydropyridine, and 2,6-dimethyl-3,5-diacetyl-4-(2',4'-dinitrophenyl)-1,4-dihydropyridine.

As such photobase generators, commercial products may also be used. Specific examples may include TPS-OH, NBC-101 and ANC-101 (tradenames, products of Midori Kagaku Co., Ltd.).

When a photoacid or photobase generator is used, the photoacid or photobase generator may be used preferably in the range of 0.1 to 15 parts by weight, more preferably in the range of 1 to 10 parts by weight, per 100 parts by weight of the polyfunctional epoxy compound.

An epoxy resin curing agent may also be incorporated in an amount of 1 to 100 parts by weight per 100 parts by weight of the polyfunctional epoxy compound.

When a polyfunctional (meth)acrylic compound is used, on the other hand, a photoradical polymerization initiator may also be used.

As the photoradical polymerization initiator, any desired one can be suitably selected from these known in the art, and can then be used. Examples may include acetophenones, benzophenones, Michler's benzoyl benzoate, amyloxime esters, oxime esters, tetramethylthiuram monosulfide and thioxanthones.

Photocleavable photoradical polymerization initiators are especially preferred. Photocleavable photoradical polymerization initiators are described in "Recent UV Curing Technologies" (in Japanese) (page 159, Publisher: TAKAUSU, Kazuhiro, Publishing Office: Gijutsu Joho Kyokai KK; 1991).

Examples of commercial photoradical polymerization initiators include Irgacure 127, 184, 369, 379, 379EG, 651, 500, 754, 819, 903, 907, 784, 2959, CGI1700, CGI1750, CGI1850, CG24-61, OXE01 and OXE02, and Darocur 1116 and 1173 and MBF (tradenames, product of BASF SE); Lucirin TPO (tradenames, product of BASF SE); Uboeryl P36 (tradename, product of product of UCD); Esacure KIP150, KIP65L'T, KIP100F, KT37, KT55, KT046 and KIP75/B (tradenames, products of Fratelli Lamberti Company).

When the photoradical polymerization initiator is used, it may be used preferably in a range of 0.1 to 200 parts by weight, more preferably in a range of 1 to 150 parts by weight, per 100 parts by weight of the polyfunctional (meth)acrylate compound.

For the purpose of promotion or the like of the reaction between the triazine ring-containing polymer and the cross-linking agent, a polyfunctional thiol compound having at least two mercapto groups in the molecule thereof may be added to the composition of the present invention.

Specifically, polyfunctional thiol compounds represented by the following formula are preferred.

[Chemical Formula 23]

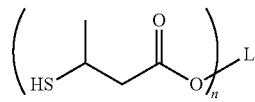

Letter L represents a divalent to tetravalent organic group, preferably a divalent to tetravalent aliphatic group having 2 to 12 carbons or a divalent to tetravalent heterocycle-containing group, more preferably a divalent to tetravalent aliphatic group having 2 to 8 carbons or a trivalent group having an isocyanuric acid skeleton (1,3,5-triazine-2,4,6 (1H,3H,5H)-trione ring) represented by the below-described formula.

Letter n corresponds to the value of the valency of L and denotes an integer of 2 to 4.

[Chemical Formula 24]

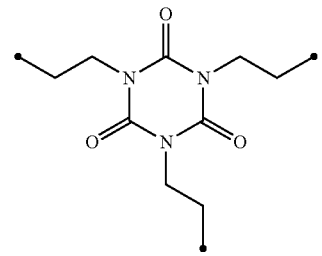

In the formula, "●"s each indicate a bonding portion with an oxygen atom.

Specific compounds may include 1,4-bis(3-mercaptobutyryloxy)butane, 1,3,5-tris(3-mercaptobutyryloxyethyl)-1,3,5-triazine-2,4,6-(1H,3H,5H)-trione, pentaerythritol tetrakis (3-mercaptobutyrate), trimethylolpropane tris(3-mercaptobutyrate), and trimethylolethane tris(3-mercaptobutyrate).

These polyfunctional thiol compounds are also available as commercial products. Examples include Karenz MT-BD1, Karenz MT NR1, Karenz MT PE1, TPMB, and TEMB (all, products of Showa Denko K.K.).

These polyfunctional thiol compounds may be used singly, or in a combination at least two.

When using the polyfunctional thiol compound, no particular limitation is imposed on the amount of the polyfunctional thiol compound to be added insofar as no deleterious effect is expected on a thin film to be obtained. In the present invention, the polyfunctional thiol compound may amount preferably to 0.01 to 10% by weight, more preferably to 0.03 to 6% by weight in 100% by weight of solids.

For the composition of the present invention, it is preferred to use a solvent and to dissolve the triazine ring-containing polymer in the solvent beforehand.

Examples of the solvent may include water, toluene, p-xylene, o-xylene, m-xylene, ethylbenzene, styrene, ethylene glycol dimethyl ether, propylene glycol monomethyl ether, ethylene glycol monomethyl ether, propylene glycol, propylene glycol monoethyl ether, ethylene glycol monoethyl ether, ethylene glycol monoisopropyl ether, ethylene glycol methyl ether acetate, propylene glycol monomethyl ether acetate, ethylene glycol ethyl ether acetate, diethylene glycol dimethyl ether, propylene glycol monobutyl ether, ethylene glycol monobutyl ether, diethylene glycol diethyl ether, dipropylene glycol monomethyl ether, diethylene glycol monomethyl ether, dipropylene glycol monoethyl ether, diethylene glycol monoethyl ether, triethylene glycol dimethyl ether, diethylene glycol monoethyl ether acetate, diethylene glycol, 1-octanol, ethylene glycol, hexylene glycol, trimethylene glycol, 1-methoxy-2-butanol, cyclohexanol, diacetone alcohol, furfuryl alcohol, tetrahydrofurfuryl alcohol, propylene glycol, benzyl alcohol, 1,3-butanediol, 1,4-butanediol, 2,3-butanediol, y-butyrolactone, acetone, methyl ethyl ketone, methyl isopropyl ketone, diethyl ketone, methyl isobutyl ketone, methyl n-butyl ketone, cyclopentanone, cyclohexanone, ethyl acetate, isopropyl acetate, n-propyl acetate, isobutyl acetate, n-butyl acetate, ethyl lactate, methanol, ethanol, isopropanol, tert-butanol, allyl alcohol, n-propanol, 2-methyl-2-butanol, isobutanol, n-butanol, 2-methyl-1-butanol, 1-pentanol, 2-methyl-1-pentanol, 2-ethylhexanol, 1-methoxy-2-propanol, tetrahydrofuran, 1,4-dioxane, N,N-dimethylformamide, N,N-dimethylacetamide (DMAc), N-methylpyrrolidone, 1,3-dimethyl-2-imidazolidinone, dimethylsulfoxide and N-cyclohexyl-2-pyrrolidinone. These may be used singly or in a combination of at least two.

As mentioned above, the triazine ring-containing polymer of the present invention has excellent solubility in organic solvents, and therefore is also soluble well in glycol ester solvents such as ethylene glycol monomethyl ether acetate, propylene glycol monomethyl ether acetate, diethylene glycol monobutyl ether acetate and diethylene glycol monoethyl ether acetate; ketone solvents such as acetone, methyl ethyl ketone, methyl isobutyl ketone, diisobutyl ketone, cyclopentanone, cyclohexanone and diacetone alcohol; and ester solvents such as ethyl acetate, methyl acetate, butyl acetate, methoxybutyl acetate, cellosolve acetate, amyl acetate, n-propyl acetate, isopropyl acetate, methyl lactate, ethyl lactate and butyl lactate. The triazine ring-containing polymer is hence particularly suited when thin films are formed at places where these solvents are needed.

No particular limitation is imposed on the concentration of solids in the composition insofar as it falls within a range that does not affect the storage stability, and may be suitably set according to the target film thickness. Described specifically, from the viewpoint of solubility and storage stability, the solids concentration may be preferably 0.1 to 50% by weight, more preferably 0.1 to 40% by weight.

In the composition of the present invention, one or more ingredients other than the triazine ring-containing polymer, crosslinking agent and solvent, for example, one or more of additives such as leveling agents, surfactants, silane coupling agents and inorganic microparticles may be contained insofar as the effects of the present invention are not impaired.

Specific examples of the surfactant may include nonionic surfactants such as polyoxyethylene alkyl ethers like polyoxyethylene lauryl ether, polyoxyethylene stearyl ether, polyoxyethylene cetyl ether and polyoxyethylene oleyl ether, polyoxyethylene alkylaryl ethers like polyoxyethylene octylphenyl ether and polyoxyethylene nonylphenyl ether, polyoxyethylene-polyoxypropylene block copolymers, sorbitan fatty acid esters like sorbitan monolaurate, sorbitan monopalmitate, sorbitan monostearate, sorbitan monooleate, sorbitan trioleate and sorbitan tristearate, and polyoxyethylene sorbitan fatty acid esters like polyoxyethylene sorbitan monolaurate, polyoxyethylene sorbitan monopalmitate, polyoxyethylene sorbitan monostearate, polyoxyethylene sorbitan trioleate and polyoxyethylene sorbitan tristearate; fluorosurfactants such as Eftop EF301, EF303 and EF352 (tradenames, products of Mitsubishi Materials Electronic Chemicals Co., Ltd., formerly Jemco Inc.), Megafac F171, F173, R-08, R-30, R-40, F-553, F-554, RS-75 and RS-72-K (tradenames, products of DIC Corporation), Fluorad FC430 and FC431 (tradenames, products of Sumitomo 3M, Ltd.), AsahiGuard AG710 and Surflon S-382, SC101, SC102, SC103, SC104, SC105 and SC106 (tradenames, products of Asahi Glass Co., Ltd.); and Organosiloxane Polymer KP341 (tradename, product of Shin-Etsu Chemical Co., Ltd.), and BYK-302, BYK-307, BYK-322, BYK-323, BYK-330, BYK-333, BYK-370, BYK-375 and BYK-378 (tradenames, products of BYK-Chemie Japan KK).

These surfactants may be used singly or in a combination of at least two. The amount of the surfactant to be used may be preferably 0.0001 to 5 parts by weight, more preferably 0.001 to 1 part by weight, even more preferably 0.01 to 0.5 part by weight per 100 parts by weight of the triazine ring-containing polymer.

Examples of the inorganic microparticles may include oxides, sulfides and nitrides of one or more metals selected from the group consisting of Be, Al, Si, Ti, V, Fe, Cu, Zn, Y, Zr, Nb, Mo, In, Sn, Sb, Ta, W, Pb, Bi and Ce, with the metal oxides being particularly suited. A single kind of inorganic microparticles may be used, or at least two kinds of inorganic microparticles may be used in combination.

Specific examples of such metal oxides may include $Al_2O_3$, $ZnO$, $TiO_2$, $ZrO_2$, $Fe_2O_3$, $Sb_2O_5$, $BeO$, $ZnO$, $SnO_2$, $CeO_2$, $SiO_2$, and $WO_3$.

Further, it is also effective to use a plurality of metal oxides as a composite oxide. The term "composite oxide" means one obtained by mixing at least two inorganic oxides in the manufacturing stage of microparticles. Examples may include composite oxides such as $TiO_2$ and $ZrO_2$; $TiO_2$, $ZrO_2$ and $SnO_2$; and $ZrO_2$ and $SnO_2$.

Further, the composite oxide may be a compound of the above-described metals. Examples may include $ZnSb_2O_6$, $BaTiO_3$, $SrTiO_3$, and $SrSnO_3$. These compounds may be used singly or in a combination of at least two, and may also be used as mixtures with the above-described oxides.

The above and other ingredients may each be added in any step during the formulation of the composition of the present invention.

The film forming composition of the present invention can be formed into a desired cured film by applying it to a substrate, and after heating the applied composition to cause evaporation of the solvent as needed, heating the resulting composition or exposing the resulting composition to light.

A desired coating method can be used for the composition. For example, a method such as spin coating, dip coating, flow coating, inkjet printing, jet dispenser coating, spray coating, bar coating, gravure coating, slit coating, roll coating, transfer printing, brush coating, blade coating or air knife coating can be adopted.

Specific examples of the substrate include silicon, indium-tin oxide (ITO) coated glass, indium zinc oxide (IZO)-coated glass, metal nanowires, and substrates formed of polyethylene terephthalate (PET), plastics, glass, quartz and ceramics. Use can also be made of flexible substrates having pliability.

For the purpose of causing evaporation of the solvent, no particular limitation Is imposed on the baking temperature, and the baking may be conducted, for example, at 110° C. to 400° C.

No particular limitation is imposed on the baking method. For example, using a hot plate or an oven, the solvent may be caused to evaporate under a suitable atmosphere, for example, under the atmosphere or an inert gas such as nitrogen, or in a vacuum.

With regard to the bake temperature and time, it is necessary to select conditions that conform to the processing steps for the target electronic device. Bake conditions can be selected such that the physical values of the resulting film conform to the characteristics required for the electronic device.

No particular limitation is imposed on conditions under which light exposure is carried out, and appropriate exposure energy and time can be adopted according to the triazine ring-containing polymer and crosslinking agent to be used.

Thin films and cured films of the present invention obtained as described above can achieve high heat resistance, high refractive index and low shrinkage rate. Accordingly, they can be suitably used in the fields of electronic devices and optical members, such as members upon fabrication of liquid-crystal displays, organic electroluminescence (EL) displays, touch panels, optical semiconductor (LED) devices, solid-state image sensors, organic thin-film solar cells, dye-sensitized solar cells, organic thin-film transistors (TFTs), lenses, prismcameras, binoculars, microscopes and semiconductor exposure systems.

In particular, thin films and cured films prepared from the composition of the present invention are high in transparency and also high in refractive index, so that their use as protective films for transparent conductive films of ITO or silver nanowires can improve their visibility and can suppress their deteriorations.

As transparent conductive films, transparent conductive films having a conductive nanostructure such as ITO films, IZO film, metal nanoparticles, metal nanowires and metal nanomeshes are preferred. Metals that form a conductive nanostructure are not particularly limited, but may include silver, gold, coppor, nickel, platinum, cobalt, iron, zinc, ruthenium, rhodium, palladium, cadmium, osmium, iridium, their alloys, and the like. Specifically described, transparent conductive films having silver nanoparticles, silver nanowires, silver nanomeshes, gold nanoparticles, gold nanowires, gold nanomeshes, copper nanoparticles, copper nanowires, copper nanomeshes or the like am preferred, and transparent conductive films having silver nanowires are notably preferred.

EXAMPLES

Examples and Comparative Examples will hereinafter be described to illustrate the present invention more specifically. It is, however, to be noted that the present invention is by no means limited to the following Examples. Individual measurement instruments used in the Examples were as follows.

[$^1$H-NMR]
  Instruments: Varian NMR System 400 NB (400 MHz) JEOL-ECA700 (700 MHz)
  Measurement solvent: DMSO-d6
  Reference material: Tetramethylsilane (TMS) (8-0.0 ppm)
[GPC]
  Instrument: HLC-8200 GPC (manufactured by Tosoh Corporation)
  Columns: Shodex KF-804L+KF-805L
  Column temperature: 40° C.
  Solvent: Tetrahydrofuran (THF)

Detector: UV (254 nm)
Calibration curve: polystyrene standard
[Ellipsometer]
  Instrument: Multiple incident angle spectroscopic ellipsometer VASE (manufactured by JA Woollam Japan Corp.)

[1] Synthesis of Triazine Ring-Containing Polymer

Example 1-1

Synthesis of Polymeric Compound [4]

[Chemical Formula 25]

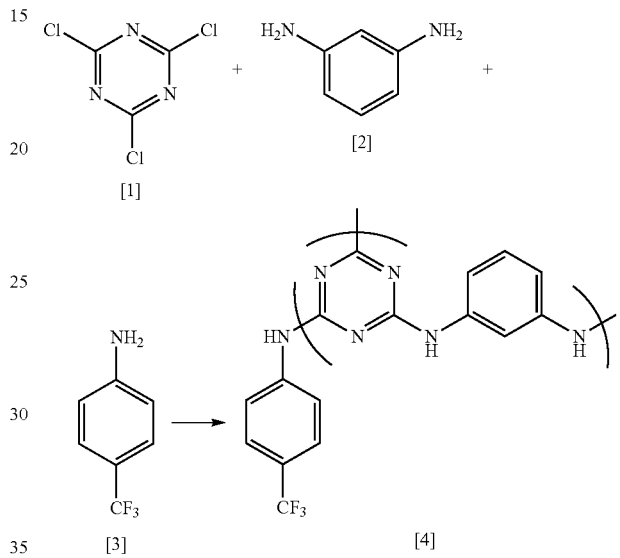

Into a 200 mL four-neck flask, 6.00 g (0.055 mmol) of m-phenylenediamine [2](product of AminoChem Company) and 78.88 g of dimethylacetamid (DMAc; product of JUNSEI CHEMICAL CO., LTD.) were added, and after nitrogen purge, the m-phenylenediamine [2] was dissolved in DMAc. Subsequently, the resulting solution was cooled to −10° C. over a dry ice bath, and 9.22 g (0.05 mol) of 2,4,6-trichloro-1,3,5-triazine [1] (product of Evonik Degussa GmbH) was added while ensuring that the temperature of the bath did not rise to at least 0° C. After stirring for one hour, 64.16 g of DMAc was added beforehand, and subsequent to nitrogen purge, the resulting reaction solution was added dropwise to a 500 mL four-neck flask which had been set beforehand at 85° C. over an oil bath. Subsequent to stirring for one hour, 23.90 g (0.15 mol) of 4-trifluoromethylaniline [3] (product of Tianjin Jiahan Chemical Co., Ltd.) was added dropwise, followed by stirring for three hours. The internal temperature was then lowered to room temperature, and 13.0 g of n-propylamine (product of Tokyo Chemical Industry Co., Ltd.) was added dropwise. After the contents were stirred for one hour, the stirring was stopped. The reaction solution was added dropwise into 910 g of deionized water to cause reprecipitation. The resulting precipitate was collected by filtration, and redissolved in 73.75 g of THF. The resulting solution was dropped into a mixed solution of 300 g of methanol and 200 g of deionized water to cause reprecipitation again. The precipitate so obtained was collected by filtration, dried at 120° C. for six hours in a vacuum dryer, whereby 16.7 g of the target polymeric compound [4] (hereinafter simply referred to as "TDF111") was obtained. Measurement results of the $^1$H-NMR spectrum of TDF111 are illustrated in FIG. 1.

The polystyrene-equivalent weight average molecular weight Mw of TDF111 as measured by GPC was 3,300, and its polydispersity Mw/Mn was 4.4.

0.5 g portions of TDF111 obtained in Example 1-1 were individually dissolved lit 4.5 g of methyl ethyl ketone, 4.5 g of methyl isobutyl ketone and 4.5 g of n-propyl acetate. TDF111 was dissolved in all the solvents, and uniform varnishes were obtained.

[2] Film-forming Composition and Preparation of Film

Example 2-1

4.0 g of TDF111 obtained in Example 1-1 was dissolved in 40.0 g of PGMEA to formulate a uniform and clear varnish (hereinafter simply referred to as "TDF111V1").

Using a spin coater, TDF111V1 obtained above was spin-coated on a glass substrate while trying to achieve a thickness of 500 nm, followed by baking for two minutes on a hot plate controlled at 150° C. so that a film (hereinafter simply referred to as "TDF111F1") was obtained.

The refractive index and thickness of TDF111F1 prepared in Example 2-1 described above are depicted in Table 1.

TABLE 1

|  | Example 2-1 |
| --- | --- |
| Refractive index (@ 550 nm) | 1.726 |
| Thickness (nm) | 395 |

As depicted in Table 1, it is understood that the thin film prepared from the polymeric compound obtained in Example 1-1 has a refractive index higher than 1.72.

[3] Formulation of Film-Forming Composition with Crosslinking Agent Added Therein and Preparation of Cured Film

Example 3-1

To 33.3 g of TDF111V1 formulated in Example 2-1, 11.1 g of a 1% by weight PGMEA solution of ethoxylated glycerol triacrylate (A-GLY-20E, 200 mPa·s; product of Shin-Nakamura Chemical Co., Ltd.) and 3.33 g of a 1% by weight PGMEA solution of ethoxylated pentaerythritol tetraacrylate (ATM-35E, 350 mPa·s; product of Shin-Nakamura Chemical Co., Ltd.) as crosslinking agents, 8.89 g of a 1% by weight PGMEA solution of Irgacure 184 (product of BASF SE) as a photoradical polymerization initiator, 3.33 g of a 1% by weight PGMEA solution of Megafac R-559 (product of DIC Corporation) as a surfactant, and 60.0 g of PGMEA were added. After visually confirming dissolution, a varnish having a solids concentration of 3% by weight was obtained (hereinafter simply referred to as "TDF11VF1").

Using a spin coater, TDF11VF1 was spin-coated at 200 rpm for five seconds and then at 1,000 rpm for 30 seconds on an alkali-free glass substrate. Using an oven, baking was conducted at 120° C. for three minutes. Subsequently, the baked film was cured to a cumulative exposure quantity of 200 mJ/cm$^2$ by a high-pressure mercury vapor lamp, so that a cured film was prepared.

The refractive index of the cured film so obtained was measured. The refractive index at 550 nm was 1.730.

Example 3-2

To 0.61 g of TDF111V1 formulated in Example 2-1, 1.23 g of a 1% by weight PGMEA solution of ethoxylated glycerol triacrylate (A-GLY-20E, 200 mPa·s; product of Shin-Nakamura Chemical Co., Ltd.) and 0.37 g of a 1% by weight PGMEA solution of ethoxylated pentaerythritol tetraacrylate (ATM-35E, 350 mPa·s; product of Shin-Nakamura Chemical Co., Ltd.) as crosslinking agents, 0.98 g of a 1% by weight PGMEA solution of Irgacure 184 (product of BASF SE) as a photoradical polymerization initiator, 0.123 g of a 1% by weight PGMEA solution of Megafac R-559 (product of DIC Corporation) as a surfactant, and 1.07 g of PGMEA were added. After visually confirming dissolution, a varnish having a solids concentration of 3% by weight was obtained (hereinafter simply referred to as "TDF11VF2").

A cured film was prepared in a similar manner as in Example 3-1 except for the use of TDF11VF2.

The refractive index of the cured film obtained above was measured. The refractive index at 550 nm was 1.702.

Example 3-3

Twenty grams of TDF-111 obtained in Example 1-1 were dissolved in 80 g of n-propyl acetate (NPAC), whereby a 20% by weight solution (hereinafter simply referred to as "TDF-111VP1") was prepared.

To 8.74 g of TDF-111VP1 prepared above, 52.41 g of a 10% by weight NPAC solution of KAYARAD DN-0075 (3,000 to 5,000 mPa·s; product of Nippon Kayaku Co., Ltd.), 3.49 g of a 10% by weight NPAC solution of ethoxylated pentaerythritol tetraacrylate (ATM-35E, molecular weight: 1,892, 350 mPa·s; Shin-Nakamura Chemical Co., Ltd.), 1.40 g of a 5% by weight propylene glycol monomethyl ether (PGME) solution of a photoradical polymerization initiator, Irgacure 2959 (product of BASF SE), 5.24 g of a 0.1% by weight NPAC solution of Karenz MT NR1 (product of Showa Denko K.K.), 1.747 g of a 1% by weight NPAC solution of a surfactant, Megafac R-40 (product of DIC Corporation), 35.48 g of NPAC and 41.49 g of PGME were added. After visually confirming dissolution, a varnish having a total solids concentration of 5% by weight was obtained (hereinafter simply referred to as "TDF-111VPF1").

Using a spin coater, TDF-111VPF1 was spin-coated at 200 rpm for five seconds and then at 1,500 rpm for 30 seconds on a soda lime glass substrate. Using a hot plate, drying was conducted at 80° C. for two minutes. Subsequently, the dried film was cured to a cumulative exposure quantity of 600 mJ/cm$^2$ by a high-pressure mercury vapor lamp, so that a cured film of 250 nm thickness was prepared.

The refractive index of the cured film so obtained was measured. The refractive index at 550 nm was 1.558.

The cured films obtained above were subjected to a scratch resistance test with BEMCOT (registered trademark) (nonwoven fabric) under the conditions of 250 g load and 10 reciprocations. As a result, they were found to be free of scratches visually, and also by observation under an optical microscope. In addition, a rubbing resistance test was conducted with BEMCOT (registered trademark), which had been impregnated with isopropyl alcohol (IPA), under similar conditions. As a result, they were found to be free of scratches visually, and also by observation under an optical microscope.

The invention claimed is:

1. A triazine ring-containing hyperbranched polymer characterized by comprising
   a recurring unit structure of formula (1) below and at least one terminal triazine ring, wherein at least a portion of the terminal triazine ring is capped with a fluorine-containing arylamino group:

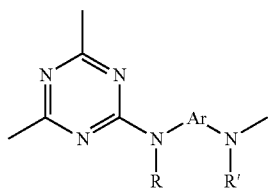 (1)

in the formula (1), R and R' each independently represent a hydrogen atom, an alkyl group, an alkoxy group, an aryl group, or an aralkyl group, and Ar represents at least one moiety selected from the group consisting of moieties of formulas (2) to (13) below:

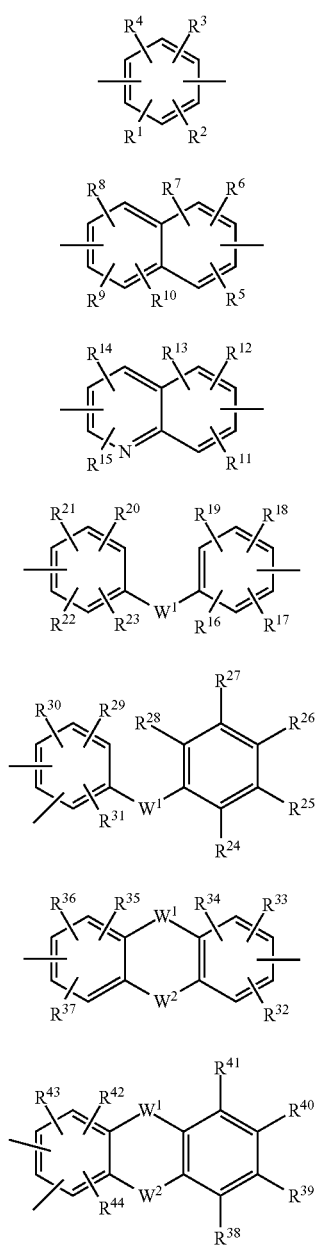

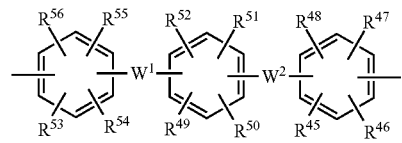

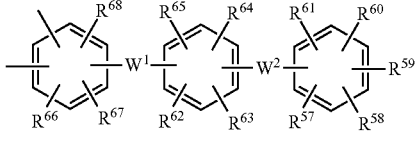

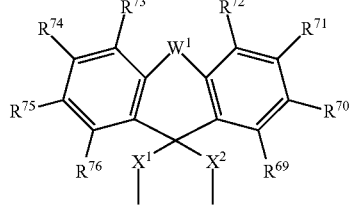

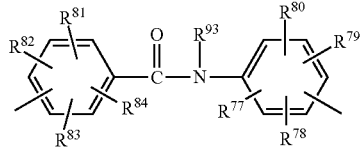

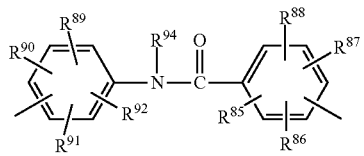

in the formulas (2) to (13), $R^1$ to $R^{92}$ each independently represent a hydrogen atom, a halogen atom, a carboxyl group, a sulfo group, a linear or branched alkyl group having 1 to 10 carbons, or a linear or branched alkoxy group having 1 to 10 carbons, $R^{93}$ and $R^{94}$ each independently represent a hydrogen atom, or a linear or branched alkyl group having 1 to 10 carbons, $W^1$ and $W^2$ each independently represent a single bond, $CR^{95}R^{96}$ in which $R^{95}$ and $R^{96}$ each independently represent a hydrogen atom or a linear or branched alkyl group having 1 to 10 carbons, with the proviso that $R^{95}$ and $R^{96}$ may be fused together to form a ring, C=O, O, S, SO, $SO_2$, or $NR^{97}$ in which $R^{97}$ represents a hydrogen atom or a linear or branched alkyl group having 1 to 10 carbons, and $X^1$ and $X^2$ each independently represent a single bond, a linear or branched alkylene group having 1 to 10 carbons, or a group of formula (14) below:

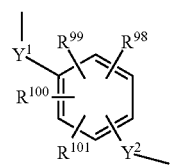

in the formula (14), $R^{98}$ to $R^{101}$ each independently represent a hydrogen atom, a halogen atom, a carboxyl group, a sulfo group, a linear or branched alkyl group having 1 to 10 carbons, or a linear or branched alkoxy group having 1 to 10 carbons, and $Y^1$ and $Y^2$ each independently represent a single bond, or a linear or branched alkylene group having 1 to 10 carbons, wherein the fluorine-containing arylamino group has formula (15) below:

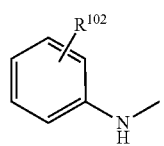

(15)

in the formula (15), $R^{102}$ represents a fluorine atom or a fluoroalkyl group having 1 to 10 carbons.

2. The triazine ring-containing hyperbranched polymer of claim 1, wherein $R^1$ to $R^{92}$ and $R^{98}$ to $R^{101}$ are each a hydrogen atom.

3. The triazine ring-containing hyperbranched polymer of claim 1, wherein the fluorine-containing arylamino group has formula (16) below:

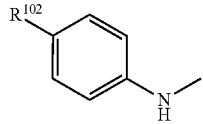

(16)

in the formula (16), $R^{102}$ has the same meaning as defined above.

4. The triazine ring-containing hyperbranched polymer of claim 1, wherein $R^{102}$ is a perfluoroalkyl group having 1 to 10 carbons.

5. The triazine ring-containing hyperbranched polymer of claim 1, wherein Ar has formula (17) below:

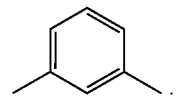

(17)

6. A film-forming composition comprising
the triazine ring-containing hyperbranched polymer of claim 1, and
an organic solvent.

7. The film-forming composition of claim 6, wherein the organic solvent is at least one selected from the group consisting of glycol ester solvents, ketone solvents and ester solvents.

8. The film-forming composition of claim 6 or 7, further comprising
a crosslinking agent.

9. The film-forming composition of claim 8, wherein the crosslinking agent is a polyfunctional (meth)acrylic compound.

10. A thin film obtained from the film-forming composition of claim 6.

11. An electronic device comprising
a substrate and
the thin film of claim 10 formed on the substrate.

12. An optical member comprising
a substrate and
the thin film of claim 10 formed on the substrate.

* * * * *